UNITED STATES PATENT OFFICE.

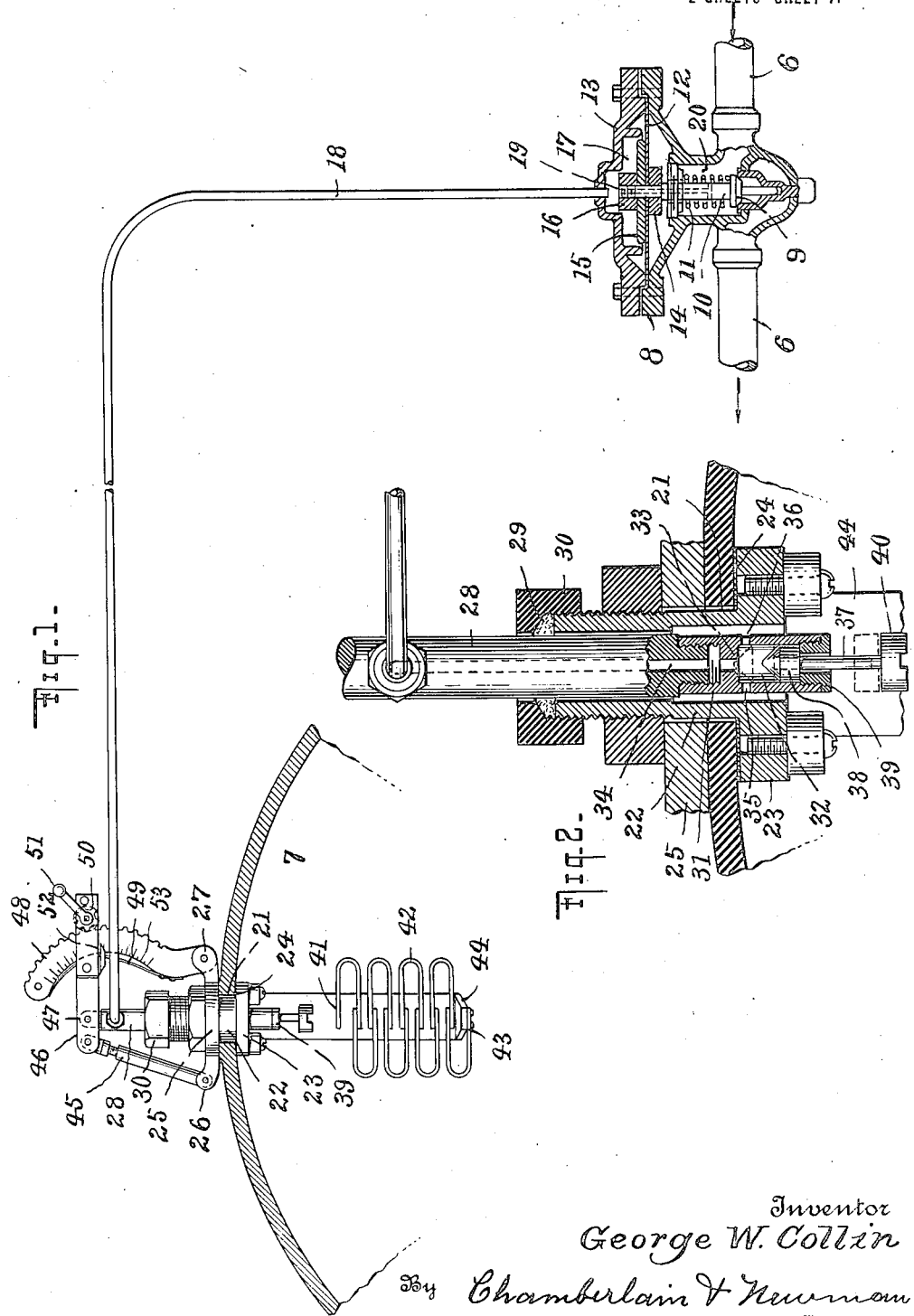

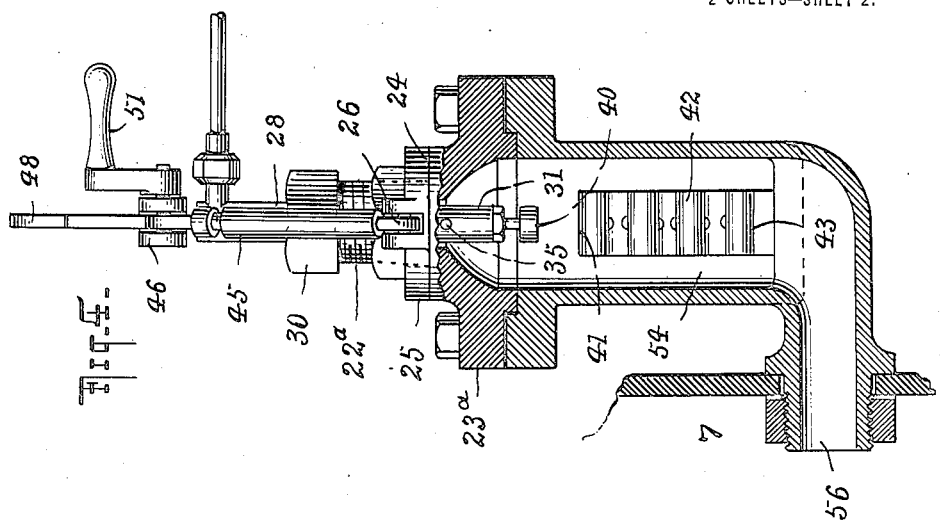
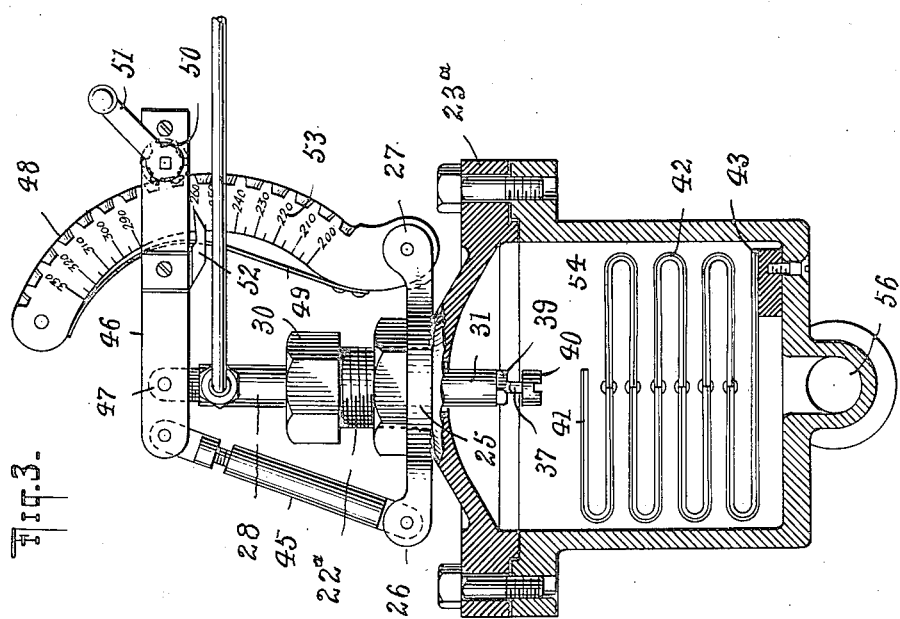

GEORGE W. COLLIN, OF BRIDGEPORT, CONNECTICUT.

THERMOSTATIC CONTROL DEVICE FOR HEATING CHAMBERS.

1,410,658.

Specification of Letters Patent.    Patented Mar. 28, 1922.

Application filed October 1, 1919. Serial No. 327,734.

*To all whom it may concern:*

Be it known that I, GEORGE W. COLLIN, a citizen of the United States, and resident of Bridgeport, in the county of Fairfield and State of Connecticut, have invented certain new and useful Improvements in Thermostatic Control Dvices for Heating Chambers, of which the following is a specification.

My invention relates to new and useful improvements in thermostatic control devices for steam supplied to steam chambers through heating pipes, coils or the like, and particularly relates to means for controlling said supply at a distant point by the rise and fall of the temperature in the steam chamber. The invention also comprises a novel form of thermostatic control device including a control valve operated through a thermostatic couple which is directly exposed to the steam chamber and the invention further comprises means for adjusting and regulating the control valve mechanism whereby the effect of the thermostat may operate the valve at different degrees of heat as required.

The object of the invention is to provide a reliable, simple and efficient form of thermostatic control device which may be applied to a heating chamber, such for instance as a heat treating chamber, where certain degrees of heat are required to be maintained and whereby the said supply of heat is controlled through and by different pressures in the chambers of the inlet valve located at a distant point from the heating chamber, and to adapt the device for either direct connection to the heating chamber or to a supplementary chamber connected with the heating chamber.

My present invention particularly belongs to that class of thermostatic control devices shown and described in my prior Patent No. 1,360,251, granted November 23, 1920, and wherein provision is made for the distant control of a heating fluid through heating pipes and the like, and is an improvement thereon in that I use a different design of control valve having a thermostatic couple for operating the same together with an adjustable device whereby the action of the control valve may be effected at various degrees of heat. The invention further comprises additional features of advantage which will later be pointed out in the specifications and claims here to follow.

My invention will be better understood with reference to the accompanying drawings which I will now proceed to describe and in which my invention is shown applied in two different manners, adapting it to different conditions and upon these drawings, corresponding reference characters will be found to designate like or corresponding parts throughout the several figures and of which, Fig. 1 shows a side view of an inlet valve positioned in a main steam supply pipe, and connected by a small pipe with my improved thermostatic control device, and including in part, a pilot valve positioned in the steam chamber, for operating the main inlet valve.

Fig. 2 shows an enlarged central vertical sectional view through the pilot valve shown in Fig. 1.

Fig. 3 shows a side view of the pilot valve, mounted on a modified form of steam chamber designed to be positioned upon the outside of the main steam chamber, and Fig. 4 is a sectional elevation of the construction shown in Fig. 3, as seen from the right thereof.

My invention is adapted for various purposes and consequently applicable to different styles and sizes of steam chambers, therefore we have shown in the drawings, a very simple form of construction illustrating the same. So far the application to practice of invention has been limited to heat treating chambers wherein the materials to be treated are positioned in the heat chamber and then the steam turned on and its temperature automatically regulated for a given length of time. In steam chambers of this sort where the construction of the chamber and the condition of the work will permit I apply a thermostatic valve control device directly to the body of the chamber with part of the apparatus extending therein. In other forms of heating chambers where the thermostat would be in the way, it would be positioned in a small auxiliary chamber that is connected with the main heating chamber. The construction of the operative parts of the invention is the same in both instances.

Referring in detail to the characters of reference marked upon the drawings, 6 represents the steam inlet pipe which in practice would be connected with a source of supply, not shown, to the steam chamber 7. 8 represents a steam inlet diaphragm valve, somewhat similar in construction to that shown in my said prior patent application and designed to operate in the same manner. In detail this valve as shown includes a body portion having an inlet and outlet to which the said pipe 6 is connected, in a manner to pass the steam through the valve and body when the latter is opened to admit of the passage of steam. A valve 9 is positioned in the body and carries a valve stem 10 upon which a spring 11 is mounted. This valve is normally held down, to close the passage through the valve body, by the spring, one end of which is seated against the valve. The outer edge portion of the diaphragm 12 is clamped between the upper flanged portion of the body and the covering plate 13. This diaphragm has its central portion secured to the valve stem by being clamped between the plates 14 and 15 and secured to the valve stem by a nut 16. This construction thus forms a steam chamber 17 above the diaphragm that is connected with the control valve through a pipe 18 and through which the pressure is built up or relieved in said chamber by the action of the pilot valve. The valve stem 10 is provided with a conduit 19 which connects the upper chamber 17 above the diaphragm with the chamber 20 in the valve body, surrounding the valve clapper 9 on the live steam side of the valve, so as to permit of a very small amount of steam passing through from the live steam side of the valve to the pressure chamber 17 above the diaphragm which serves to normally equalize the pressure on the two sides of the diaphragm until the same is released through the above mentioned connecting pipe 18.

The steam chamber 7 shown in Fig. 1 is provided with an opening 21, that is preferably located in its upper rear end portion, and into which a sleeve 22 is positioned from the inside. The lower portion of the sleeve is provided with a flange 23 that fits against the inner wall of the receptacle and is provided with a gasket 24 to seal the connection. A bracket 25 having a central hole to receive the sleeve is positioned upon the top side of the wall of the receptacle, and is provided with two extended end portions 26 and 27 to which other members of the device, later to be described are pivotally connected. The periphery of the upper end portion of the sleeve is threaded to receive the clamping nut 30 which clamps the said bracket in position as well as the sleeve 22 to the wall of the steam chamber. This sleeve is provided with a central longitudinal bore to accommodate an adjustable tubular post 28 carried therein.

The post 28 is frictionally held in the hollow sleeve by a packing 29 that is clamped between the top end of the sleeve and a nut 30 that is preferably slipped on the post before the same is positioned in the sleeve. This post is thus adapted to be adjusted longitudinally by the adjusting device later to be described. A detachable extension 31 having therein a valve chamber 32 and a valve seat 33, is threadably secured to the lower end of the post. The valve chamber in this extension connects with the longitudinal steam passage 34 extending up in the post and is further provided with steam ports 35 and 36, that form passages from the said valve chamber to the above mentioned steam chamber 7 in which the lower extension of the post is positioned. A valve 38 is provided with a stem 37 that extends out through a hole in a closure cap 39 in the lower end of the extension, and upon the lower end of this stem is formed a head 40 against which the upper end 41 of the expandable thermostat 42 operates. The lower end of this thermostat may be supported at 43 upon a hanger 44 as shown in Figs. 1 and 2 or upon the bottom portion of the body 54 forming a special steam chamber as shown in Figs. 3 and 4.

The auxiliary valve 38 as shown in Fig. 2 is in an open position and is adapted to be closed by the expansion of the thermostat due to excessive heat in the steam chamber 7. The degree of heat necessary to bring about the closing of the valve may be regulated by adjusting the tubular post and its valve in respect to the contacting end portion of the thermostat 42 through the mechanism mounted on the outside of the steam chamber, which I will now describe.

Upon the arm 26 of the bracket 25 is mounted a link 45 to which an adjustable lever 46 is pivotally connected, the intermediate portion of said lever being also pivotally connected as at 47 to the above mentioned tubular post 28. The outer end portion of the lever is bifurcated to receive a rack 48, the lower end of which is pivotally connected to the arm 27 of the bracket 25 before mentioned. The upper end portion of this rack is curved to better permit the lever to be adjusted thereon. A spring 49 is secured to and positioned against the inner edge of the rack and extends through the arm in a way to form a friction sufficient to hold the lever in an adjusted position. A pinion 50 is rotatably positioned in the outer end portion of the lever in a way to engage the teeth of the outer edge of the rack. A handle 51 is connected to the shaft upon which the pinion is mounted for the purpose of rotating the pinion and to move the lever with respect to the rack. A pointer 52 is secured to the lever and is designed to be read in connection with the graduations 53 upon the face of the rack, which indicates the position at which the lever must be set to cause the pilot valve to operate at a certain degree of heat as indicated upon the face of the rack by said graduations.

In Figs. 3 and 4 I have shown my auxiliary valve mechanism as well as the thermostat for operating the same mounted upon a special form of steam chamber 54 which in practice would be connected by a pipe 56 with the main steam chamber 7. This special steam chamber 54 is designed to house the thermostat for operating the valve when it would not be practical to position the thermostat directly in the main heating chamber. This chamber may be constructed in any preferred manner and likewise connected to any suitable part of the casing of the main steam chamber. This special steam chamber 56 being connected by a large opening with the main steam chamber, is designed to be heated to the same degree as the main chamber, and the thermostat is thus equally susceptible to any change in temperature contained therein.

In the form of construction shown in Figs. 3 and 4 it will be noted that the sleeve 22ª is formed integral with the cover 23ª of the special steam chamber and that the bracket 25 is mounted upon the sleeve and positioned upon the cover 23ª.

From the foregoing it will be seen that the operation of the device is as follows. The steam passes through the intake pipe 6 when the main valve 9 is open, which fills and heats the chamber 7 causing the thermostat to expand to engage and raise the valve stem and valve to close the passage 34. This causes the main steam pressure to build up in the chamber 17, through the port 19, in a manner to operate the diaphragm and close the main valve 9, and cut off the supply to the heating chamber. On the other hand, when the temperature in the heating chamber drops sufficiently, the thermostat will contract and open the port 34 in a manner to relieve the pressure in the chamber 17 and to permit the normal greater pressure on the underside of the diaphragm to again open the main valve.

Having thus described my invention, what I claim and desire to secure by Letters Patent, is,

1. In a thermostatic control device, the combination with a heating chamber and a supply pipe, of an inlet valve therefor having a fluid-pressure-actuated diaphragm, of a thermostatically operated pilot valve located at a distance from said inlet valve and extending into the heating chamber, a thermostat within the heating chamber for directly operating the pilot valve by the rise and fall of temperature in the heating chamber, and a conduit connecting the fluid-pressure-actuated diaphragm of the inlet valve to the supply connection of the pilot valve.

2. In a thermostatic control device, the combination with a heating chamber and a supply pipe connected therewith, of an inlet valve in the supply pipe having a pressure actuated diaphragm for operating the same and including a pressure chamber on each side of the diaphragm connected with the inlet side of the valve, a thermostatically operated pilot valve located at a distant point from the inlet valve, and extending into the heating chamber, a conduit connecting the pressure chamber above the diaphragm of the inlet valve with the pilot valve, a thermostat contained within the heating chamber for direct engagement with the pilot valve to open the same for controlling the passage of fluid through the inlet valve and to the heating chamber, and means for adjusting the pilot valve with respect to the thermostat.

3. In a thermostatic control device, the combination with a heating chamber and a supply pipe connected therewith, of an inlet valve having a diaphragm for operating the same by the initial fluid pressure and including a pressure chamber on each side of the diaphragm, a small port in the valve stem connecting the pressure chamber on the top side of the diaphragm with the under or live steam side, a thermostatically operated pilot valve located at a distant point from the inlet valve and extending into the heating chamber, a conduit connecting the control chamber above the diaphragm with the pilot valve, a thermostat contained within the heating chamber directly engage the pilot valve for controlling the passage of fluid through the inlet valve and to the heating chamber, and adjustable means for determining the time for the pilot valve to operate.

4. In a thermostatic control device, the combination with a heating chamber and a supply pipe connected therewith, of an inlet valve having a diaphragm for operating the same by the initial fluid pressure and including a pressure chamber on each side of the diaphragm, a small port connecting the chambers on the opposite sides of the diaphragm, a sleeve secured to the wall of the heating chamber, a tubular post adjustably mounted in the sleeve, a pilot valve mounted in the tubular post and adapted to control the passage of fluid through the post and to and from the heating chamber, a conduit connecting the chamber above the diaphragm with the tubular post and pilot valve, a thermostat contained within the heating chamber to open and close the pilot valve, and adjustable means for determining the time for operating the pilot valve.

Signed at Bridgeport, in the county of Fairfield and State of Connecticut, this 29th day of September, A. D., 1919.

GEORGE W. COLLIN.

Witnesses:
JOSEPH L. PARRAGA,
LILLIAN M. ALLING.